US008006212B2

(12) United States Patent
Sinha et al.

(10) Patent No.: US 8,006,212 B2
(45) Date of Patent: Aug. 23, 2011

(54) METHOD AND SYSTEM FOR FACILITATING FLOORPLANNING FOR 3D IC

(75) Inventors: Subarnarekha Sinha, Menlo Park, CA (US); Charles C. Chiang, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 477 days.

(21) Appl. No.: 12/182,263

(22) Filed: Jul. 30, 2008

(65) Prior Publication Data

US 2010/0031217 A1 Feb. 4, 2010

(51) Int. Cl.
*G06F 17/50* (2006.01)
(52) U.S. Cl. ........ 716/122; 716/111; 716/119; 716/123; 716/129; 716/130; 716/135; 716/138
(58) Field of Classification Search ................. 716/2, 4, 716/9, 10, 13, 14, 111, 119, 122, 123, 129, 716/130, 135, 138
See application file for complete search history.

(56) References Cited

U.S. PATENT DOCUMENTS

| 7,921,384 | B2* | 4/2011 | Solomon | 716/30 |
|---|---|---|---|---|
| 2008/0244500 | A1* | 10/2008 | Solomon | 716/16 |
| 2009/0066366 | A1* | 3/2009 | Solomon | 326/41 |
| 2009/0070721 | A1* | 3/2009 | Solomon | 716/8 |
| 2009/0070727 | A1* | 3/2009 | Solomon | 716/16 |
| 2009/0070728 | A1* | 3/2009 | Solomon | 716/16 |
| 2009/0319965 | A1* | 12/2009 | Kariat et al. | 716/4 |

OTHER PUBLICATIONS

Healy et al., "Multiobjective Microarchitectural Floorplanning for 2-D and 3-D ICs", IEEE Transactions on Computer-Aided Design of Integrated Circuits and Systems, vol. 26, No. 1, Jan. 2007, pp. 38-52.*
Cheng, Lei et al., "Floorplanning for 3-D VLSI Design", Session: Floorplanning and partitioning, pp. 405-411, Year of Publication: 2005, ISBN:0-7803-8737-6, http://portal.acm.org/citation.cfm?id=1120725.1120899&coll=portal&dl=ACM&type=series&idx=SERIES480&part=series&WantType=Proceedings&title=ASPDAC, viewed Aug. 1, 2008.
Wong, Eric et al., "3D Floorplanning with Thermal Vias", Design, Automation and Test in Europe, 2006. Date apos; 06. Proceedings, vol. 1, Issue , Mar. 6-10, 2006 pp. 1-6.
Zhou, Pingqiang et al., "3D-STAF: Scalable Temperature and Leakage Aware Floorplanning for Three-Dimensional Integrated Circuits", 2007 IEEE, pp. 590-597.
Cong, Jason et al., "A Thermal-Driven Floorplanning Algorithm for 3D ICs", http://cadlab.cs.ucla.edu/~cong/papers/3dfp.pdf, viewed Sep. 23, 2008.
Li, Zhuoyuan et al., "Hierarchical 3-D Floorplanning Algorithm for Wirelength Optimization", IEEE Transactions on circuits and systems—I: Regular Papers, vol. 53, No. 12, Dec. 2006, pp. 2637-2646.
Black, Bryan et al., "Die Stacking (3D) Microarchitecture", The 39th Annual IEEE/ACM International Symposium on Microarchitecture (MICRO'06), 2006 IEEE.

(Continued)

*Primary Examiner* — Phallaka Kik
(74) *Attorney, Agent, or Firm* — Park, Vaughan, Fleming & Dowler LLP; Shun Yao

(57) ABSTRACT

One embodiment of the present invention provides a system for facilitating floorplanning for three-dimensional integrated circuits (3D ICs). During operation, the system receives a number of circuit blocks. The system places the blocks in at least one layer of a multi-layer die structure and sets an initial value of a time-varying parameter. The system then iteratively perturbs the block arrangement until the time-varying parameter reaches a pre-determined value.

30 Claims, 6 Drawing Sheets

OTHER PUBLICATIONS

"IBM adds a milestone to 3D packaging", Posted : Jun. 1, 2007, http://www.eetindia.co.in/login.do?fromWhere=/ARTP_8800466845_1800007.HTM, viewed Sep. 23, 2008.

"The Era of Tera: Intel Reveals more about 80-core CPU", http://www.anandtech.com/printarticle.aspx?i=2925, viewed Sep. 23, 2008, pp. 1-13.

Cong, Jason et al., "Thermal-Aware Physical Design Flow for 3-D IC's", IEEE International VLSI Multilevel Interconnection Conference, Sep. 2006, pp. 73-80.

Law, Jill H.Y. et al., "Block Alignment in 3D Floorplan Using Layered TCG", Proceedings of the 16th ACM Great Lakes symposium on VLSI, Apr. 2006, pp. 376-380.

Pang, Yingxin et al., "Rectilinear block packing using O-tree representation", Proceedings of the 2001 international symposium on Physical design, Apr. 2001, pp. 156-161.

Wong, Eric et al., "3D Floorplanning with Thermal Vias", 2006, EDAA, pp. 1-6.

* cited by examiner

METHOD AND SYSTEM FOR FACILITATING FLOORPLANNING FOR 3D IC

FIELD

The present disclosure relates generally to the design of integrated circuits (ICs). More specifically, the present disclosure relates to a method and system for facilitating floorplanning in three-dimensional (3D) ICs.

RELATED ART

The continued shrinking of very-large-scale integration (VLSI) circuits according to the Moore's Law mandates packaging and interconnection technologies to keep up. Three-dimensional integrated circuits (3D ICs) are gaining much interest as a viable solution to help maintain the pace of system demands on scaling, performance, and functionality.

A key benefit of 3D ICs is system-size reduction. In traditional technologies, system assembly is based on two-dimensional (2D) planar architecture. Dies are individually packaged and connected on a planar interconnect substrate, e.g., printed circuit boards (PCBs). The die-to-package ratio is generally low (on the order of 50%) and additional spacing between components on the board is typically required, which further reduces the area efficiency to about 30%.

Another reason for delving into 3D ICs is performance. Interconnects in a 3D assembly are potentially much shorter than in a 2D configuration. This feature allows 3D ICs to have higher operating speed and lower power consumption.

The third motivating factor to consider 3D ICs is so-called hetero-integration. A true system-on-a-chip (SOC) device with a large variety of functional circuit blocks, e.g., logic, analog, and memory, is fairly difficult to build. Furthermore, the substrate used to build active devices may vary significantly between technologies. Besides "vertical" scaling, chip designers are also experiencing "horizontal" scaling. If a high-density 3D IC technology is available, a 3D SOC can be manufactured using a stack of heterogeneous devices. This device would be smaller, consume less power, and provide higher performance when compared with a monolithic SOC. Furthermore, 3D integration can circumvent certain roadblocks in process technology that have prevented the practical integration of best-in-class analog devices with best-in-class digital devices.

Because 3D ICs tend to be more complex since they integrate larger amounts of functionality and contain diverse technologies, the design, representation, and optimization of 3D ICs require changes to many stages in the design flow. Particularly, optimization of 3D ICs involves an additional degree of freedom, the z-dimension, which well-designed electronic design automation (EDA) tools need to exploit to provide better solutions. Furthermore, it will be necessary to represent constraints imposed by multiple technologies concurrently. Thus, changes to the infrastructure as well as the analysis and optimization approaches at the various design stages are needed to enable 3D IC design. Certain problems, such as heat dissipation, which are already becoming an issue for 2D ICs, will gain greater prominence with 3D ICs. This challenge is due to the larger power density in the 3D structure and the poor thermal conductivity of the dielectric layers between the device layers, which can increase the possibility of thermal runaway of the chip.

Among all the EDA tasks, die floorplanning is an important stage. Most currently available 3D floorplanning techniques are mere extensions of 2D techniques and focus primarily on wirelength optimization and thermal issues. These techniques do not consider manufacturability and design constraints, and often appear inadequate in obtaining a global optimized solution.

SUMMARY

One embodiment of the present invention provides a system for facilitating floorplanning for three-dimensional integrated circuits (3D ICs). During operation, the system receives a number of circuit blocks. The system further receives a set of parameters for a 3D structure, wherein the parameters include one or more of: die area, maximum total wirelength, maximum number of through-silicon vias (TSVs) on a respective layer, and aspect ratio of a respective layer in the 3D structure. The system then computing a floorplan for the circuit blocks across the layers in the 3D structure by optimizing a cost function, wherein the cost function is based on the total area, wirelength, and TSVs used by the circuit blocks, the aspect ratio of the area occupied by the circuit blocks in each layer, and the highest temperature produced by the circuit blocks for a given floorplan.

One embodiment of the present invention provides a system for facilitating floorplanning for three-dimensional integrated circuits (3D ICs). During operation, the system receives a number of circuit blocks. The system places the blocks in at least one layer of a multi-layer die structure and sets an initial value of a time-varying parameter. The system then iteratively performs the following iteration operations until the time-varying parameter reaches a pre-determined value.

During the iteration, the system perturbs the current arrangement of the blocks. The system further computes the value of a cost function based on a total die area, a total wirelength, a total number of through-silicon vias (TSVs), and an aspect ratio of the die required by the blocks in the pre-perturbation arrangement and the perturbed arrangement. If the computed value of the cost function is less than the cost-function value associated with the pre-perturbation arrangement, the system accepts the perturbed block arrangement as the current block arrangement. If the computed value of the cost function is greater than or equal to the cost-function value associated with the pre-perturbation arrangement, the system accepts the perturbed block arrangement as the current block arrangement with a non-zero probability which decreases with the time-varying parameter. The system also decrements the time-varying parameter.

Subsequent to the iterative operations, the system produces a result indicating the final block arrangement across different layers.

In one variation on this embodiment, perturbing the current arrangement of the blocks involves performing one or more of the following operations: moving at least one block, swapping two blocks, rotating at least one block, and flipping at least one block.

In a further variation, the perturbation is performed with an increased probability of moving blocks from a congested layer to a layer with more unused space.

In a further variation, the perturbation is performed based on the slack of one or more blocks within the bound of the die area on a respective layer.

In a further variation, slack-based block moving is favored when the time-varying parameter is above a pre-determined value.

In a further variation, slack-based block swapping is favored when the time-varying parameter is equal to or below the pre-determined value.

In one variation on this embodiment, the system decomposes at least one block larger than a pre-determined size to smaller blocks after the time-varying parameter reaches a pre-determined intermediate value.

In a further variation, the system increases the time-varying parameter after the time-varying parameter reaches the pre-determined intermediate value, thereby allowing the decomposed blocks to experience additional perturbation.

In one variation on this embodiment, receiving the circuit blocks involves receiving the blocks in a pre-existing two-dimensional (2D) or 3D floorplan.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

The main approach of vertical system integration is to stack thinned devices (die or wafer) by accurately aligning, bonding, and arbitrarily interconnecting them using through-silicon vias (TSVs). In a typical flow, the circuit design is engineered to fit onto separate layers which are manufactured accordingly on separate wafers. Subsequently, the wafers are aligned, stacked and thinned. Somewhere in this process, the TSVs are incorporated into the stacked wafers/dies to realize the vertical connections. The exact sequence of these operations varies widely among the different methods.

Figure 1:
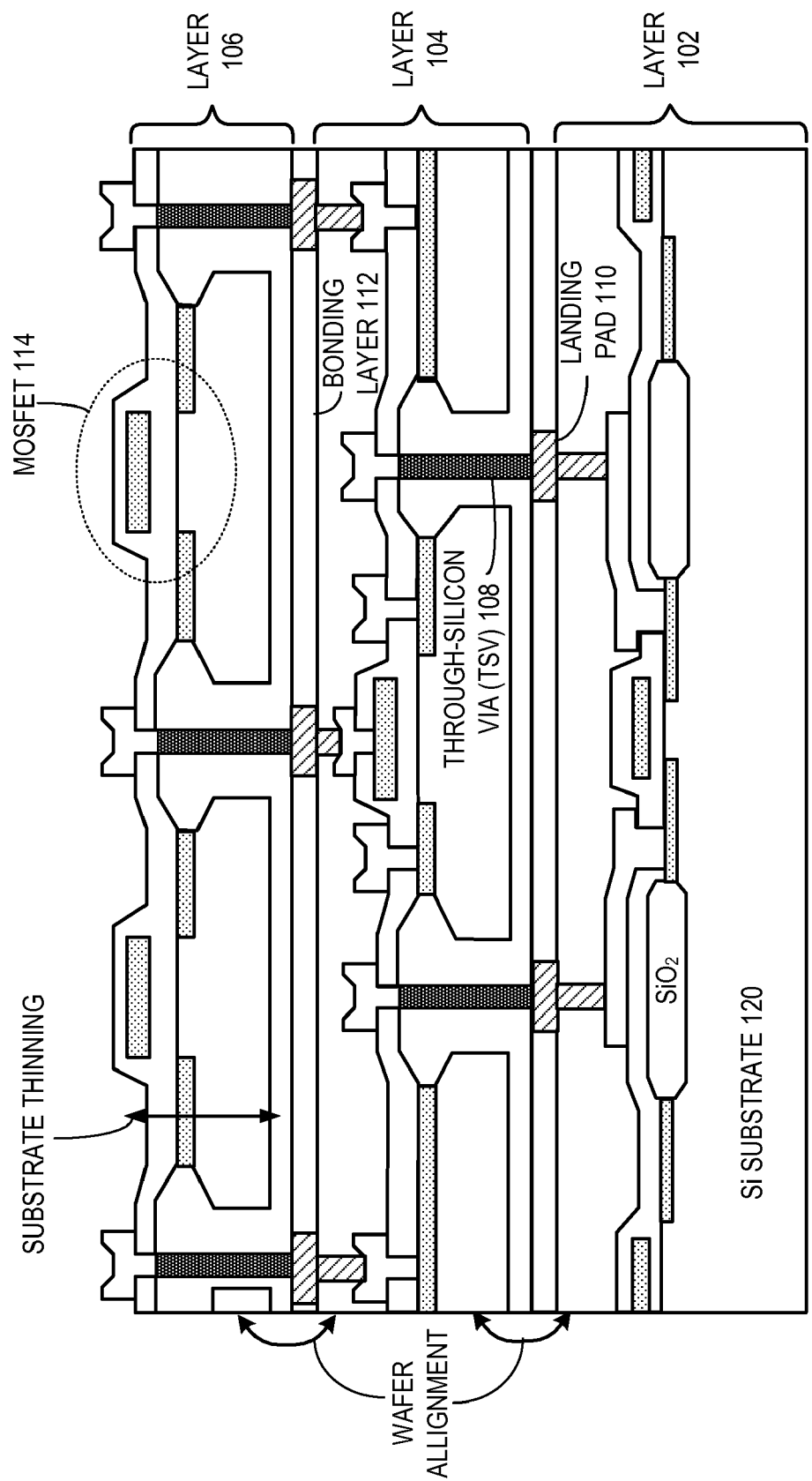
FIG. 1 illustrates an exemplary 3D IC structure.

FIG. 1 illustrates an exemplary 3D IC structure. The illustrated structure includes three wafer layers, layers 102, 104, and 106. A respective layer contains a number of circuits, such as MOSFET 114 in layer 106. Layer 102 includes a Si substrate 120. Layers 104 and 106 are both thinned by a substrate-thinning process. These three layers are aligned by a wafer alignment process and bonded together by bonding layers, such as bonding layer 112, to form the 3D structure. The devices in different layers are coupled by TSVs, such as TSV 108. A respective TSV is in contact with a landing pad in another layer. For example, TSV 108 couples a device in layer 104 to a device in layer 102 through a landing pad 110 in layer 102.

Embodiments of the present invention provide a method for facilitating 3D floorplanning by arranging given circuit blocks within the die outline of each layer in a 3D structure. The result is a block arrangement across different layers of the 3D structure that optimizes a number of parameters, such as area utilization, wirelength, aspect ratio, and TSV-related constraints. In embodiments of the present invention, the present floorplanning tool uses an iterative perturbation method, namely simulated annealing, to find a substantially optimal solution.

Simulated annealing (SA) is a generic probabilistic meta-algorithm for the global optimization problem, namely locating a good approximation to the global optimum of a given function in a large search space. SA is often used when the search space is discrete. The name "simulated annealing" comes from annealing in metallurgy, a technique involving heating and controlled cooling of a material to increase the size of its crystals and reduce their defects. The heat causes the atoms to become unstuck from their initial positions (a local minimum of the internal energy) and wander randomly through states of higher energy; the slow cooling process gives the atoms more chances of finding configurations with lower internal energy than the initial one.

Figure 2:
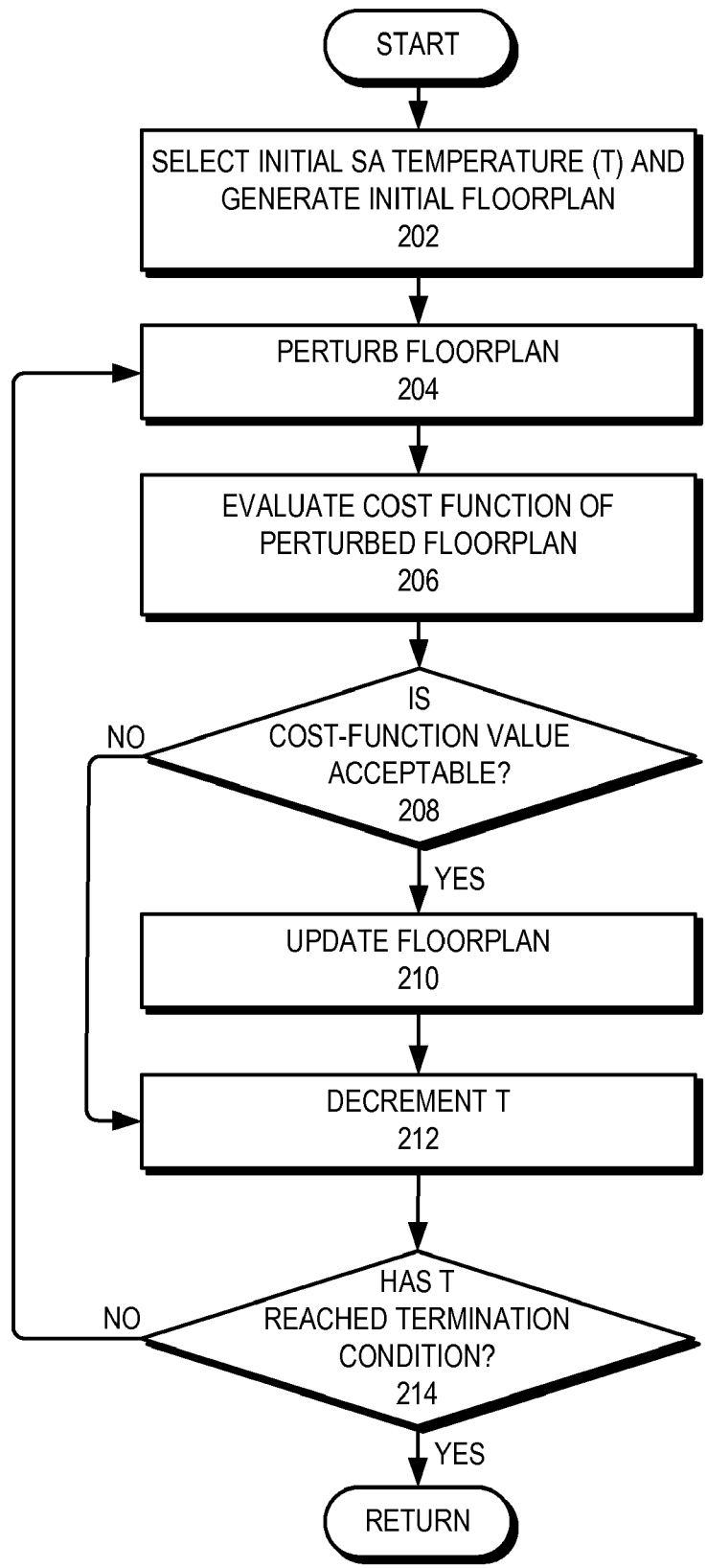
FIG. 2 presents a flowchart illustrating an exemplary process of 3D floorplanning, in accordance with an embodiment of the present invention.

By analogy with this physical process, each step of the SA process replaces the current solution by a random "nearby" solution, chosen with a probability that depends on the difference between the values of a corresponding cost function (which resembles the energy level in a real annealing process) and on a global parameter T (called the temperature), which is gradually decreased during the SA process. In general, when the T is large, the system accepts a perturbed solution which results in a higher cost-function value with a non-zero probability (as opposed to a greedy algorithm where the system only accepts a solution with a lower cost-function value). Note that this non-zero probability decreases with the annealing temperature, and approaches zero as T goes down to zero. As a result, the current solution changes almost randomly when T is large, but becomes increasingly "downhill" as T goes to zero. The allowance for "uphill" moves when T is large saves the process from becoming stuck at local minima—which are the bane of greedier methods. Note that in this disclosure the time-varying parameter T is referred to as simulated annealing temperature or SA temperature. This parameter is not related to the physical temperature. Instead, it is a parameter to control the advancement of the SA process FIG. 2 presents a flowchart illustrating an exemplary process of 3D floorplanning, in accordance with an embodiment of the present invention. During operation, the 3D floorplanning system first selects an initial SA temperature value and generates an initial floorplan (operation 202). Note that the initial floorplan can be any arrangement of the blocks across the layers. Subsequently, the system perturbs the floorplan (operation 204). The system then evaluates the cost function of the perturbed floorplan (operation 206). The system further determines whether the cost-function value is acceptable (operation 208). If so, the system updates the floorplan with the perturbed block arrangement (operation 210). Otherwise, the system proceeds to decrement the SA temperature, T (operation 212). Next, the system determines whether T has reached a termination condition (operation 214). For example, if T reaches zero, the termination condition is met. If so, the system returns. Otherwise, the system goes back into the loop and continues to perturb the floorplan (operation 204).

Problem Formulation

The general 3D fixed-outline floorplanning problem (3D-FOFP) can be formulated as follows. Let $B=\{b_i | 1 \leq i \leq n\}$ be a set of given circuit blocks, wherein each block $b_i$ has a width $w_i$ and height $h_i$. Each block is free to rotate and/or flip. Furthermore, the floorplan is expected to satisfy certain constraints related to the die outline, TSVs, and thermal issues. The fixed outline constraint ensures that the given dimensions on the dies are satisfied, e.g., the dies in all the layers are contained in a given outline. The fixed outline constraint (often referred to as the fixed die constraint) is typically used for hierarchical design. This constraint is often included in a floorplanning process because pure wirelength and/or area minimization may still result in a unusable solution if the solution does not fit within the given outline. The desired width W and desired height H of each die can be provided. Alternatively, the maximum aspect ratio and maximum allowable unused space can be provided from which W and H for all the dies can be calculated. The manufacturability constraints are related to TSVs. A key constraint in this area is to ensure the number of TSVs between every pair of adjacent die layers is within a certain user-specified bound. The bound can vary for the different layers and is typically calculated based on TSV pitch considerations, which depend on the bonding scheme being used. An additional constraint is related to thermal issues. Due to larger power density and poor thermal conductivity in the 3D structure, thermal issues should be considered during floorplanning. A key thermal constraint would be to limit the maximum possible temperature in any die layer.

The objective of the floorplanning tool is to find a coordinate $(x_i, y_i, l_i)$ for the lower-left corner of each block $b_i$, such that $0 \leq x_i \leq W - w_i$; $0 \leq y_i \leq H - h_i$; $1 \leq l_i \leq L$; and no overlapping between any two blocks is present.

In one embodiment, the width W and height H of each die in the 3D structure is the same. In that case, it is possible to calculate the width W and height H of the chip from the chip area and the maximum allowable unused space. The calculation is as follows. Assume that the sum of the area of all the blocks is A, the number of layers of the 3D IC is L, the maximum allowable fraction of the white space (i.e., unutilized space) is $\in$, and the given aspect ratio (i.e., the ratio between height and width) of a die is γ. Then, the width W and height H of the 3D IC (as well as the die in each layer) can be expressed as:

$$W = \sqrt{(1 \in) \cdot A \cdot \gamma / L}; H = \sqrt{(1 + \in) \cdot A / (\gamma \cdot L)}$$

Previous work in fixed-outline floorplanning has been done in the context of 2D floorplanning. Traditional floorplanning succeeds in optimizing a linear combination of cost functions such as area and wirelength. However, fixed-outline floorplanning is computationally significantly harder than minimizing the linear cost functions under the outline-free condition. The primary reason for the failure of traditional floorplanning tools is the lack of intelligent solution permutation methods.

Figure 3:
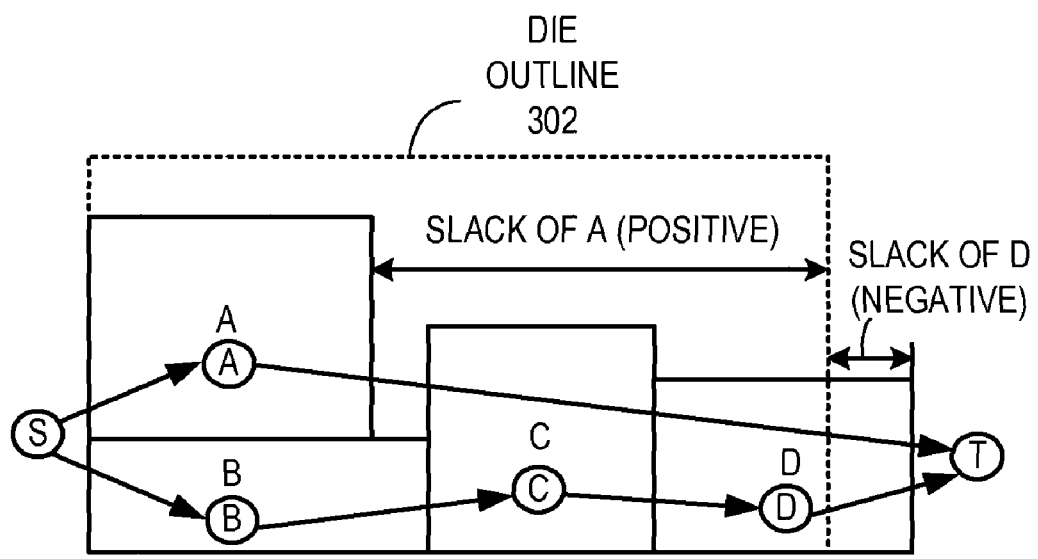
FIG. 3 illustrates the concept of spatial slack in accordance with an embodiment of the present invention.

Embodiments of the present invention use the concept of "spatial slack" for block permutations. FIG. 3 illustrates the concept of spatial slack in accordance with an embodiment of the present invention. A horizontal-constraint graph is constructed as shown in FIG. 3 by the directed edges and the vertices S, A, B, C, D, and T. In this graph, the left and the right boundary of the fixed outline are the "source" (vertex S) and "sink" (vertex T), respectively. Each of blocks A, B, C, and D is represented by a corresponding vertex, and the weight of the vertex is assigned as the width of the corresponding block.

The computation of spatial slacks is similar to that of the static timing analysis (STA) slacks, except the STA is performed on an edge-weighted graph, whereas the horizontal constraint graph in FIG. 3 is vertex weighted. Therefore, before calculating the spatial slacks, the weight of each vertex is assigned to the vertex's incident edge. As illustrated in FIG. 3, the right edge of block D has exceeded the right boundary of the fixed die outline 302, and the slack of vertex D is negative. Thus, it is unfavorable to move any block to the right of block D when we perturb the current sequence pair. On the contrary, since the slack of block A is greater than the width of block D, moving block D to the right of block A can satisfy the fixed outline constraint. Hence, moving a block with small spatial slack next to a block with large spatial slack is a potentially good permutation, and the system can bias the probability of making this kind of permutation. In this disclosure, the term "slack" is used to specify spatial slack. Embodiments of the present invention use the concept of spatial slack to guide the block movements. More details on slack-based block arrangement can be found in S. Adya and I. Markov, "Fixed-outline floorplanning through better local search," in *Proc. Intl. Conf. on Computer Design,* 2001, pp. 328-334, and H. Murata, K. Fujiyoshi, S. Nakatake, and Y. Kajitan, "VLSI module placement based on rectangle-packing by the sequence pair," *IEEE Systems,* vol. 15, no. 12, pp. 1518-1524, 1996, both of which are incorporated by reference herein.

3D Fixed-Outline Floorplanning

Embodiments of the present invention use an array of sequence pairs to represent the position of blocks. For each layer, a sequence pair is used to express the placement of blocks in this layer. Since in current 3D IC technology a TSV is several times larger than the normal via in size, it is beneficial to limit the maximum number of TSVs in order to minimize area usage. Therefore, embodiments of the present invention limit the number of TSVs in each layer to keep manufacturability in consideration. The following sections describe various aspects of the 3D-FOFP approach.

3D-FOFP Algorithm

As mentioned earlier, embodiments of the present invention use a simulated-annealing approach and allow for both inter-layer and intra-layer block moves. In one embodiment, the system initially keeps all the blocks in the first layer and generates a random sequence pair to represent an initial floorplan of the blocks. Next, the initial sequence pair is fed into the floorplanning tool, which aims to generate a floorplanning result without violating the fixed-outline constraint and TSV bound constraint. At the same time, the tool seeks to minimize the total wirelength of the 3D design.

During the simulated annealing process, the blocks are moved to different layers and are evenly distributed among layers such that the various objectives can be met. To facilitate the convergence of the solution and satisfy the fixed outline constraint, the concept of slack-based move is extended to apply to 3D floorplans. Furthermore, the TSV-overflow costs and the wirelength costs are incorporated into the cost function to satisfy the TSV constraint and to optimize the wirelength. In one embodiment, it is possible to have a second phase where large blocks are allowed to be decomposed into smaller blocks. (This disclosure refers to the first phase as 3D-1 and the second phase as 3D-2). The smaller blocks can then be moved to consecutive layers in an attempt to improve the success rate of the floorplanning and to optimize the wirelength. The basic idea behind this second phase is that the smaller blocks have more flexibility to move. In one embodiment, the result of 3D-1 is fed into 3D-2 to further optimize the wirelength and improve the success rate of satisfying the fixed-outline constraint.

Temperature Scheduling

In one embodiment, the initial annealing temperature is set to a very high value, e.g., 30,000 degrees. At this high temperature stage, inferior solutions have a high probability of being accepted. Then, the annealing temperature is exponentially reduced with a base close to 1, and the acceptance probability of inferior solutions is gradually reduced accordingly. When the annealing temperature is very close to 0 degrees, the probability of accepting an inferior solution is close to 0, and the 3D floorplanning algorithm behaves like a greedy algorithm. In one embodiment, after the SA temperature drops below a certain cool-down threshold, the 3D-1 phase is terminated and the 3D-2 phase is invoked.

Figure 4:
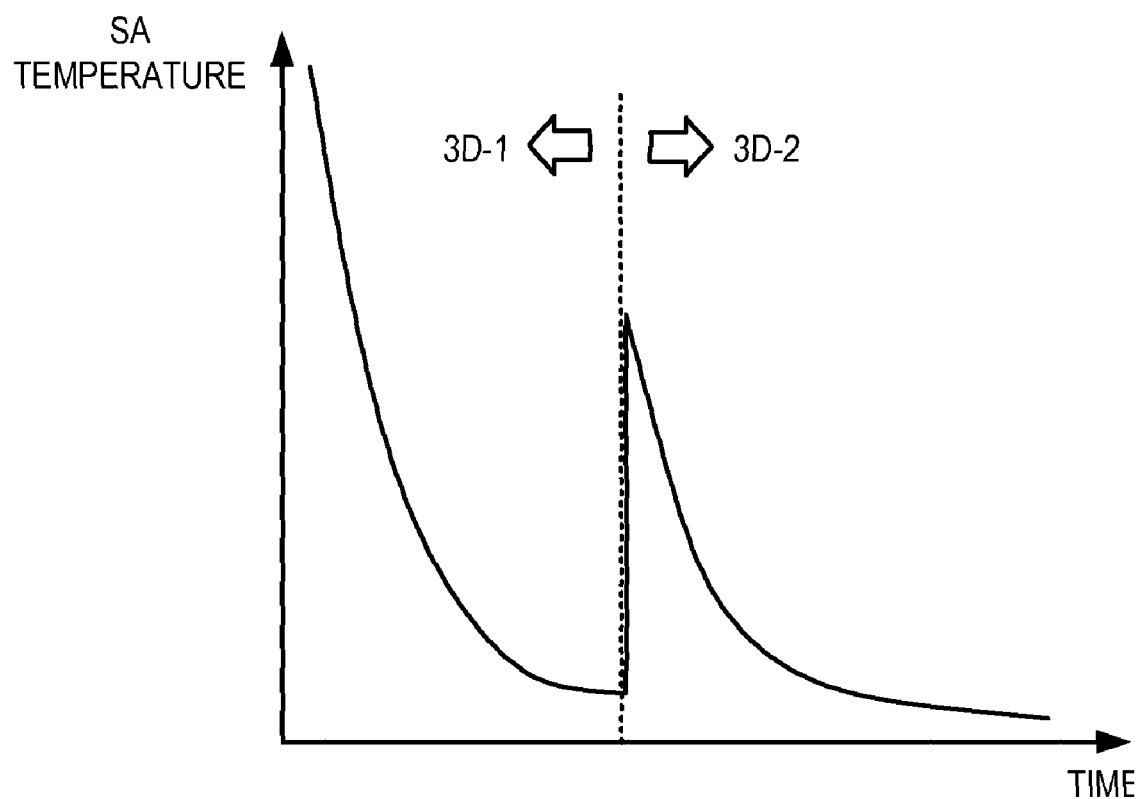
FIG. 4 illustrates an exemplary simulated-annealing temperature control curve, in accordance with an embodiment of the present invention.

Note that, if the initial temperature of 3D-2 is too high, the system might completely lose the floorplanning result obtained in 3D-1, and the system might not gain the benefit from the result of 3D-1. Thus, in one embodiment, the annealing temperature is raised to a relatively low temperature compared with the initial temperature of 3D-1 at the beginning of 3D-2, and then gradually decreased. The plot of annealing temperature vs. timing is shown in FIG. 4.

Perturbation Methods

During each step of the SA iterations, new block arrangements are obtained by altering the position(s) of a block or a pair of blocks. The perturbation methods used in each step of the simulated annealing process can be categorized as follows.

(1) Random perturbations: These perturbations include intra-layer moves, inter-layer moves, intra-layer swaps, and inter-layer swaps on randomly selected blocks or pairs of blocks. During a move, a block is moved from one position to another. During a swap, on the other hand, the positions of two blocks are interchanged.

(2) Area-balancing perturbations: In this perturbation, the movement of blocks is biased to increase the probability of moving blocks from a congested layer to a layer with more white space. These moves enable better utilization of the white space in each layer.

(3) Slack-based perturbations: There are four types of perturbation included in this category. They are intra-layer slack-based move, inter-layer slack-based move, intra-layer-slack-based swap, and inter-layer-slack-based swap. The slack information is used to select the blocks for moving or swapping.

(4) Rotation and flipping perturbations: Block rotation increases the number of allowable geometric combinations for compacting the rectangular blocks, thereby potentially increasing the success rate of meeting the fixed outline constraint. Block flipping on the other hand, helps reduce the wirelength.

(5) Half-perimeter wirelength (HPWL)-aware perturbations: In order to minimize the wirelength, this perturbation moves a block to the center of mass of the pins that connect with this block.

Note that the aforementioned perturbations are only a few of many possible perturbation techniques. Additional perturbations can be introduced to obtain improved solutions for other design constraints.

Figure 5:
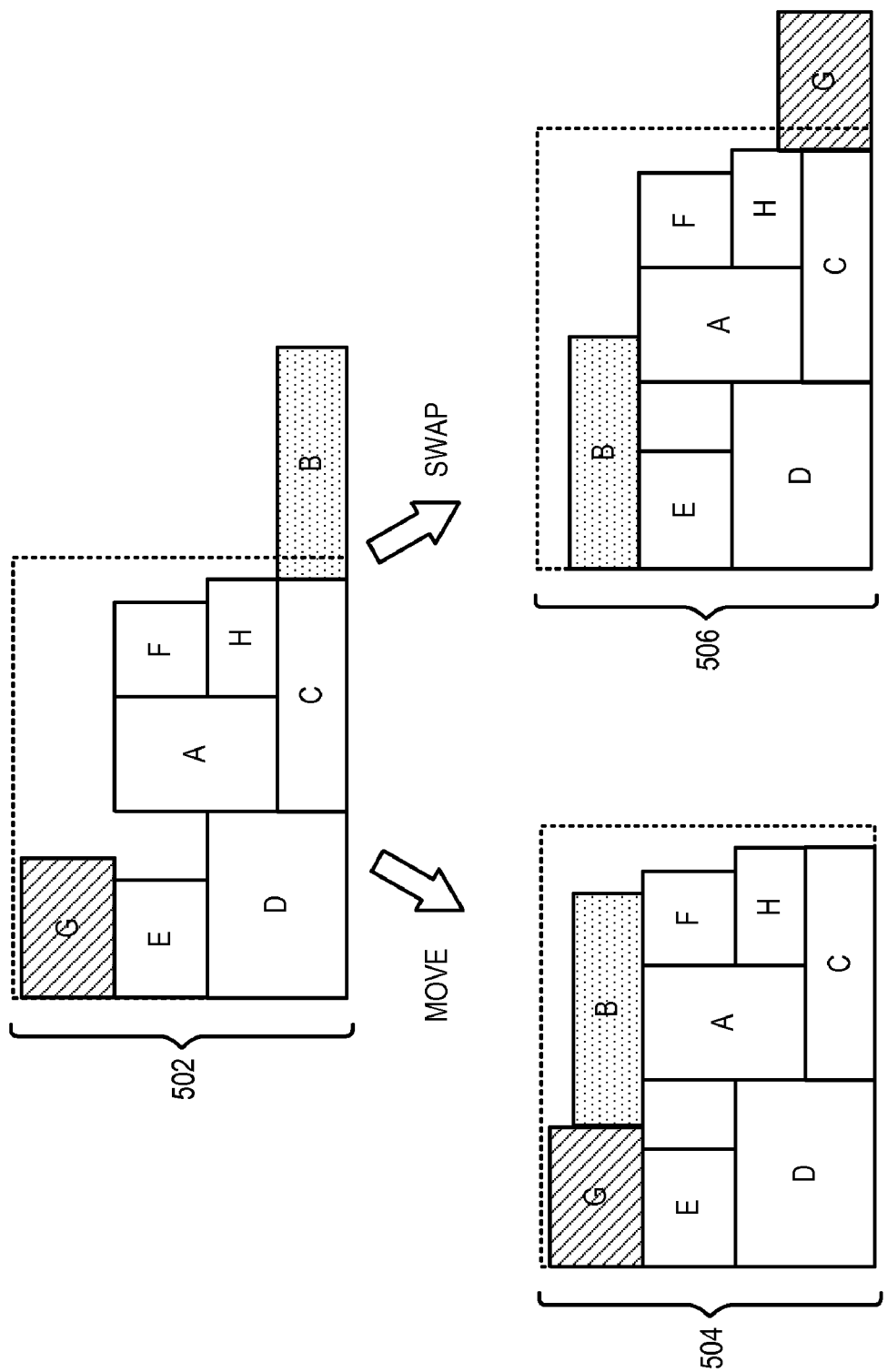
FIG. 5 illustrates an example of floorplanning results at a high simulated-annealing temperature, in accordance with an embodiment of the present invention.

Empirical evidence shows that except for the slack-based move and slack-based swap, randomly picking a perturbation during each simulated annealing step achieves good-quality results. On the other hand, the slack-based moves and swaps have demonstrated significant SA temperature dependence as explained below. When the annealing temperature is high, the placement of the block may violate the fixed outline constraint significantly. FIG. 5 is an example of floorplanning results at a high temperature stage. In the initial floorplan 502, block G and block B have the maximum and minimum slacks in the horizontal direction, respectively. Since the difference between maximum and minimum slacks is very large, directly moving block B to the right of block G, which is shown in floorplan 504, has a better chance to increase the slacks of the critical blocks by the width of B. Therefore, floorplan 504 is more compact and compliant than floorplan 502. On the contrary, if the system performs slack-based swap, the critical slacks can only be increased by an amount equal to the difference of width of block B and block G, as shown in floorplan 506. Compared with the slack-based move, the slack-based swap has less chance to improve the critical slacks at the high temperature stage. Note that "critical slack" refers to the most negative or least positive slack among all the blocks.

Figure 6:
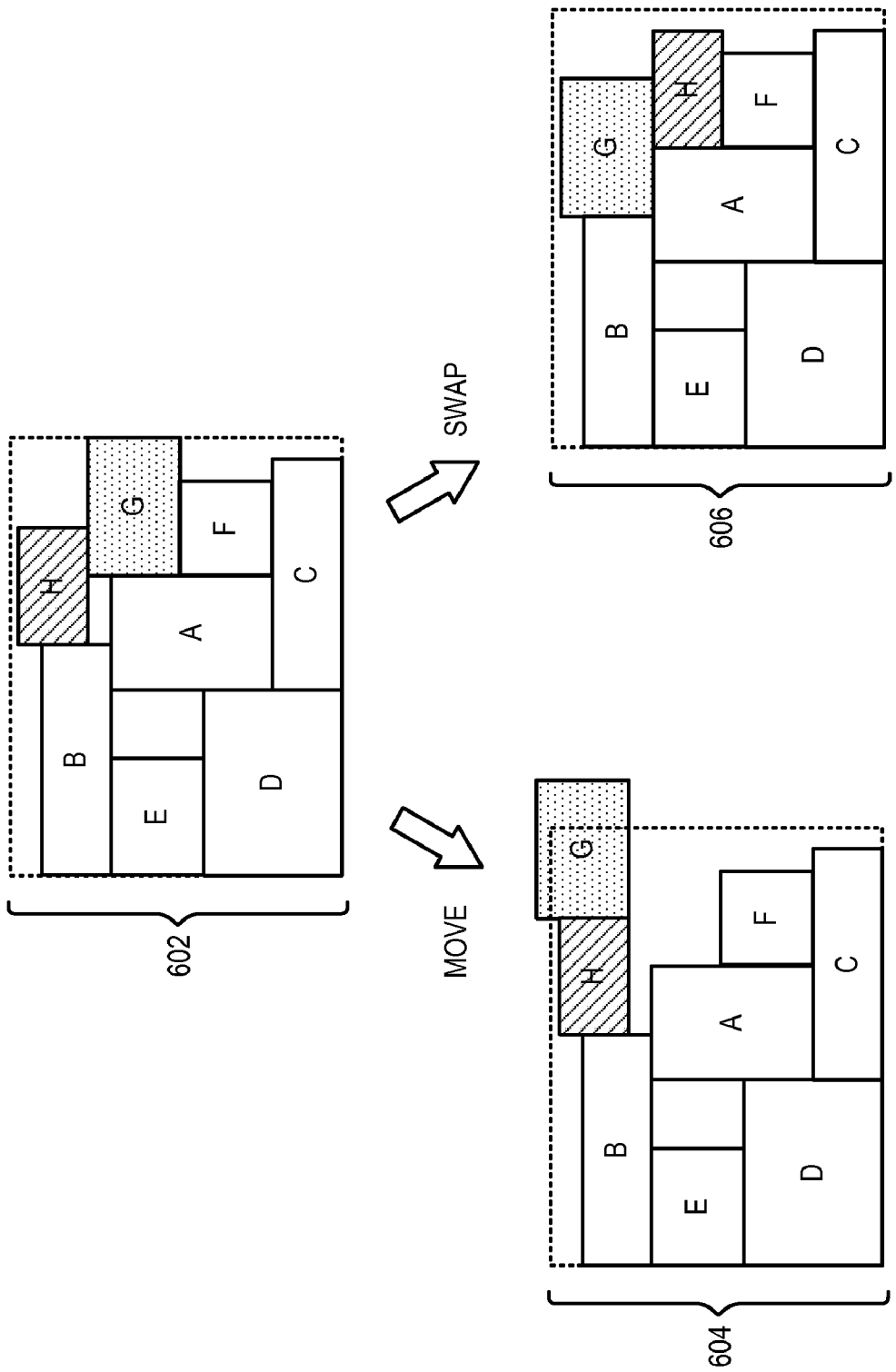
FIG. 6 illustrates an example of floorplanning results at a low simulated-annealing temperature, in accordance with an embodiment of the present invention.

However, when the SA temperature cools down, the floorplan becomes more compact. As a result, a slack-based move becomes an unfavorable perturbation method. As shown in FIG. 6, in the initial floorplan 602, the differences between the slacks of blocks are not as pronounced as in the high SA temperature stage. Under this condition, the slack-based move (which is shown in floorplan 604) has a higher probability to make the slacks of the non-critical blocks negative, and thereby impedes the convergence of the simulated annealing process. Thus, the slack-based swap (which is shown in floorplan 606) becomes the preferred perturbation method at a low-temperature stage. In general, the temperature-dependent perturbations help achieve better quality of results.

Cost Function

In one embodiment, to handle multiple objectives such as area minimization, wirelength minimization, and compliance with aspect-ratio and TSV bound, the following objective function is used:

$$\text{cost} = \alpha \times D\text{Area} + \beta \times DWL + \chi \times DAR + \delta \times \text{Overflow},$$

where $\alpha$, $\beta$, $\chi$, and $\delta$ are user-defined constants.

At the beginning of each iteration step, the initial solution is set to be the last accepted solution. The terms CurArea, CurWL, and CurAR denote the area, wirelength, and aspect ratio of the last accepted solution, respectively. Note that a floorplan's aspect ratio is the aspect ratio of the smallest bounding box that contains all the blocks. Similarly, the terms PtbArea, PtbWL, and PtbAR denote the area, wirelength, and aspect ratio of the perturbed solution, respectively. In addition, the terms BArea, TSVOverflow, and TSVBound represent the sum of area of the blocks, overflow of TSV, and upper bound of TSV, respectively. The terms in the cost function are defined as follows:

$$D\text{Area} = (Ptb\text{Area} - Cur\text{Area})/B\text{Area};$$

$$DWL = (PtbWL - CurWL)/CurWL;$$

$$DAR = (PtbAR - CurAR)^2;$$

$$\text{Overflow} = TSV\text{Overflow}/TSV\text{Bound}.$$

The terms DArea and DAR penalize floorplanning results which occupy larger areas or violate the aspect ratio of the given fixed outline. These terms and the slack-based perturbation help enhance the success rate for satisfying the fixed-outline constraint. The DWL term helps the floorplanning tool optimize the wirelength. In addition, Overflow cost can prevent the floorplanning result from violating the TSV constraint.

The aforementioned cost function is only one of many possible cost functions. The cost function can also include additional terms, such as terms related to the 3D structure's thermal characteristics, to reflect different design constraints.

Exemplary Floorplanning System

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 7:
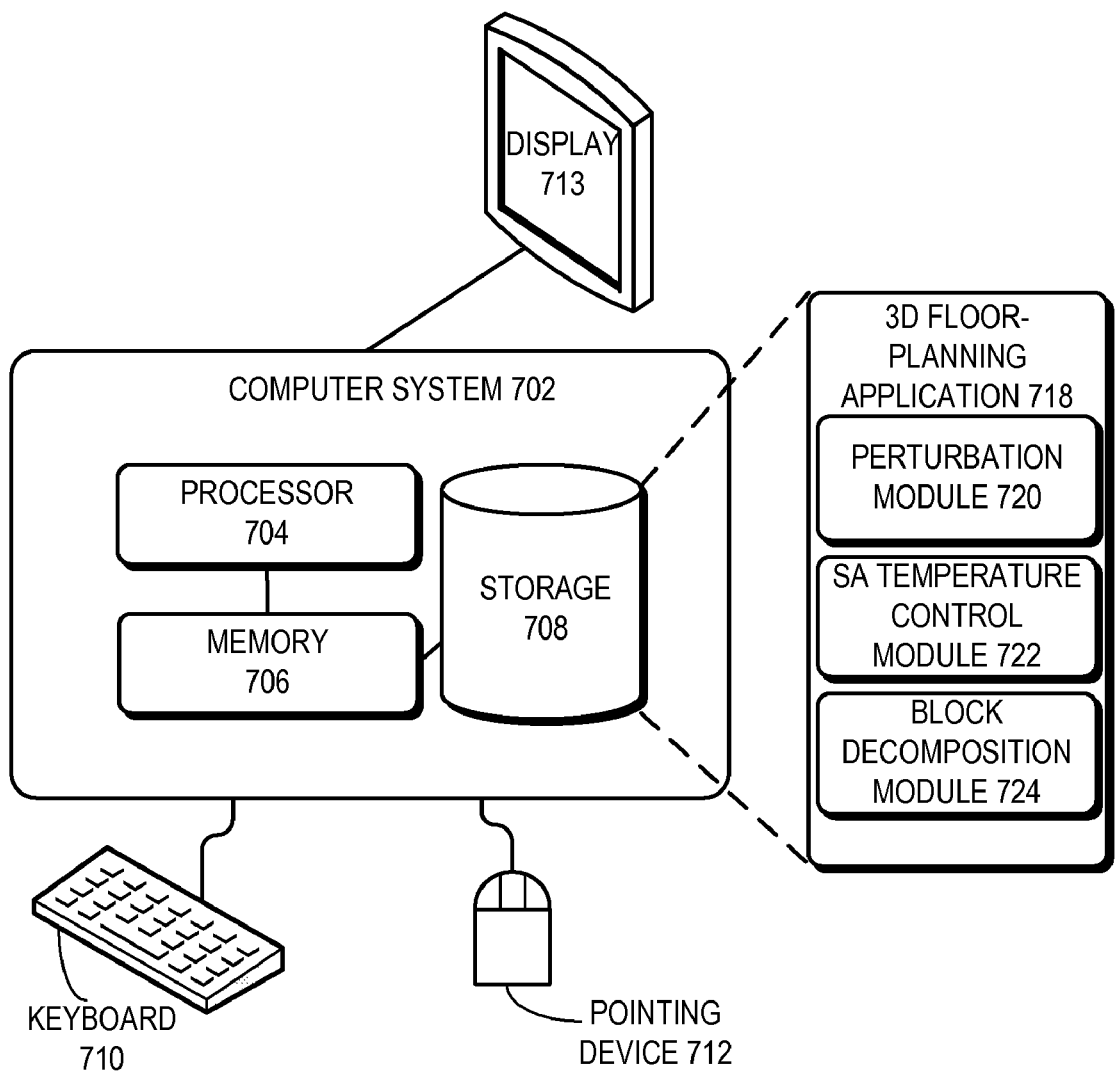
FIG. 7 illustrates an exemplary computer system for facilitating 3D floorplanning, in accordance with one embodiment of the present invention.

FIG. 7 illustrates an exemplary computer system for facilitating 3D floorplanning, in accordance with one embodiment of the present invention. A computer system 702 is coupled to a display 713, a keyboard 710, and a pointing device 712. Computer system 702 includes a processor 704, a memory 706, and a storage device 708. Storage device 708 stores code for a 3D floorplanning application 718, which in turn includes a perturbation module 720, an SA temperature control module 722, and a block decomposition module 714. During operation, 3D floorplanning application 718 is loaded from storage device 708 into memory 706 and then executed by processor 704. The final results may be displayed on display 713.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for facilitating floorplanning for three-dimensional integrated circuits (3D ICs), the method comprising:
    receiving a number of circuit blocks;
    receiving a set of parameters for a 3D structure, wherein the parameters include one or more of:
        die area;
        maximum total wirelength;
        maximum number of through-silicon vias (TSVs) on a respective layer in the 3D structure; and
        aspect ratio of a respective layer in the 3D structure; and
    computing, by computer, a floorplan for the circuit blocks across a set of layers in the 3D structure by optimizing a cost function, wherein the cost function is based on a total area used by the circuit blocks, a total wirelength used by the circuit blocks, a total number of TSVs used by the circuit blocks, an aspect ratio of an area occupied by circuit blocks in each layer in the 3D structure, and a highest temperature produced by the circuit blocks for a given floorplan.

2. A non-transitory computer-readable storage medium storing code which when executed by a computer causes the computer to perform a method for facilitating floorplanning for three-dimensional integrated circuits (3D ICs), the method comprising:
    receiving a number of circuit blocks;
    receiving a set of parameters for a 3D structure, wherein the parameters include one or more of:
        die area;
        maximum total wirelength;
        maximum number of through-silicon vias (TSVs) on a respective layer in the 3D structure; and
        aspect ratio of a respective layer in the 3D structure; and
    computing a floorplan for the circuit blocks across a set of layers in the 3D structure by optimizing a cost function, wherein the cost function is based on a total area used by the circuit blocks, a total wirelength used by the circuit blocks, and a total number of TSVs used by the circuit blocks, an aspect ratio of an area occupied by circuit blocks in each layer in the 3D structure, and a highest temperature produced by the circuit blocks for a given floorplan.

3. A computer system for facilitating floorplanning for three-dimensional integrated circuits (3D ICs), the computer system comprising:
    a processor;
    a memory;
    a receiving mechanism configured to receive a number of circuit blocks and a set of parameters for a 3D structure, wherein the parameters include one or more of:
        die area;
        maximum total wirelength;
        maximum number of through-silicon vias (TSVs) on a respective layer in the 3D structure; and
        aspect ratio of a respective layer in the 3D structure; and
    a computing mechanism configured to compute a floorplan for the circuit blocks across a set of layers in the 3D structure by optimizing a cost function, wherein the cost function is based on a total area used by the circuit blocks, a total wirelength used by the circuit blocks, and a total number of TSVs used by the circuit blocks, an aspect ratio of an area occupied by circuit blocks in each layer in the 3D structure, and a highest temperature produced by the circuit blocks for a given floorplan.

4. A computer-executed method for facilitating floorplanning for three-dimensional integrated circuits (3D ICs), the method comprising:
    receiving a number of circuit blocks;
    placing the blocks in at least one layer of a multi-layer die structure;
    setting an initial value of a time-varying parameter;
    iteratively performing, by computer, the following operations until the time-varying parameter reaches a predetermined value:
        perturbing a current arrangement of the blocks;
        computing a value of a cost function based on a total die area, a total wirelength, a total number of through-silicon vias (TSVs), and an aspect ratio of a die required by the blocks in a pre-perturbation arrangement and a perturbed arrangement;
        if the computed value of the cost function is less than a cost-function value associated with the pre-perturbation arrangement, accepting the perturbed block arrangement as the current block arrangement;

if the computed value of the cost function is greater than or equal to the cost-function value associated with the pre-perturbation arrangement, accepting the perturbed block arrangement as the current block arrangement with a non-zero probability which decreases with the time-varying parameter; and decrementing the time-varying parameter; and subsequent to the iterative operations, producing a result indicating the final block arrangement across different layers.

5. The method of claim 4, wherein perturbing the current arrangement of the blocks comprises performing one or more of the following operations:

moving at least one block;
swapping two blocks;
rotating at least one block; and
flipping at least one block.

6. The method of claim 5, wherein the perturbation is performed with an increased probability of moving blocks from a congested layer to a layer with more unused space.

7. The method of claim 5, wherein the perturbation is performed based on a slack of one or more blocks within the bound of the die area on a respective layer.

8. The method of claim 7, wherein slack-based block moving is favored when the time-varying parameter is above a pre-determined value.

9. The method of claim 7, wherein slack-based block swapping is favored when the time-varying parameter is equal to or below the pre-determined value.

10. The method of claim 4, further comprising decomposing at least one block larger than a pre-determined size to smaller blocks after the time-varying parameter reaches a pre-determined intermediate value.

11. The method of claim 10, further comprising increasing the time-varying parameter after the time-varying parameter reaches the pre-determined intermediate value, thereby allowing the decomposed blocks to experience additional perturbation.

12. The method of claim 4, wherein receiving the circuit blocks comprises receiving the blocks in a pre-existing two-dimensional (2D) or 3D floorplan.

13. A non-transitory computer-readable storage medium storing code which when executed by a computer causes the computer to perform a method for facilitating floorplanning for three-dimensional integrated circuits (3D ICs), the method comprising:

receiving a number of circuit blocks;
placing the blocks in at least one layer of a multi-layer die structure;
setting an initial value of a time-varying parameter;
iteratively performing the following operations until the time-varying parameter reaches a pre-determined value:
perturbing a current arrangement of the blocks;
computing a value of a cost function based on a total die area, a total wirelength, a total number of through-silicon vias (TSVs), and an aspect ratio of a die required by the blocks in a pre-perturbation arrangement and a perturbed arrangement;
if the computed value of the cost function is less than a cost-function value associated with the pre-perturbation arrangement, accepting the perturbed block arrangement as the current block arrangement;
if the computed value of the cost function is greater than or equal to the cost-function value associated with the pre-perturbation arrangement, accepting the perturbed block arrangement as the current block arrangement with a non-zero probability which decreases with the time-varying parameter; and decrementing the time-varying parameter; and subsequent to the iterative operations, producing a result indicating the final block arrangement across different layers.

14. The computer-readable storage medium of claim 13, wherein perturbing the current arrangement of the blocks comprises performing one or more of the following operations:

moving at least one block;
swapping two blocks;
rotating at least one block; and
flipping at least one block.

15. The computer-readable storage medium of claim 14, wherein the perturbation is performed with an increased probability of moving blocks from a congested layer to a layer with more unused space.

16. The computer-readable storage medium of claim 14, wherein the perturbation is performed based on a slack of one or more blocks within the bound of the die area on a respective layer.

17. The computer-readable storage medium of claim 16, wherein slack-based block moving is favored when the time-varying parameter is above a pre-determined value.

18. The computer-readable storage medium of claim 16, wherein slack-based block swapping is favored when the time-varying parameter is equal to or below the pre-determined value.

19. The computer-readable storage medium of claim 13, wherein the method further comprises decomposing at least one block larger than a pre-determined size to smaller blocks after the time-varying parameter reaches a pre-determined intermediate value.

20. The computer-readable storage medium of claim 19, wherein the method further comprises increasing the time-varying parameter after the time-varying parameter reaches the pre-determined intermediate value, thereby allowing the decomposed blocks to experience additional perturbation.

21. The computer-readable storage medium of claim 13, wherein receiving the circuit blocks comprises receiving the blocks in a pre-existing two-dimensional (2D) or 3D floorplan.

22. A computer system for facilitating floorplanning for three-dimensional integrated circuits (3D ICs), the computer system comprising:

a processor;
a memory;
a receiving mechanism configured to receive a number of circuit blocks;
an initial placement mechanism configured to place the blocks in at least one layer of a multi-layer die structure;
a time-varying parameter setting mechanism configured to set an initial value of a time-varying parameter;
an iteration mechanism configured to iteratively perform the following operations until the time-varying parameter reaches a pre-determined value:
perturbing a current arrangement of the blocks;
computing a value of a cost function based on a total die area, a total wirelength, a total number of through-silicon vias (TSVs), and an aspect ratio of a die required by the blocks in a pre-perturbation arrangement and a perturbed arrangement;
if the computed value of the cost function is less than a cost-function value associated with the pre-perturbation arrangement, accepting the perturbed block arrangement as the current block arrangement;

if the computed value of the cost function is greater than or equal to the cost-function value associated with the pre-perturbation arrangement, accepting the perturbed block arrangement as the current block arrangement with a non-zero probability which decreases with the time-varying parameter; and decrementing the time-varying parameter; and a result producing mechanism configured to produce, subsequent to the iterative operations, a result indicating the final block arrangement across different layers.

23. The computer system of claim 22, wherein while perturbing the current arrangement of the blocks, the iteration mechanism is further configured to perform one or more of the following operations:

moving at least one block;
swapping two blocks;
rotating at least one block; and
flipping at least one block.

24. The computer system of claim 23, wherein the perturbation is performed with an increased probability of moving blocks from a congested layer to a layer with more unused space.

25. The computer system of claim 23, wherein the perturbation is performed based on a slack of one or more blocks within the bound of the die area on a respective layer.

26. The computer system of claim 25, wherein slack-based block moving is favored when the time-varying parameter is above a pre-determined value.

27. The computer system of claim 25, wherein slack-based block swapping is favored when the time-varying parameter is equal to or below the pre-determined value.

28. The computer system of claim 22, further comprising a block-decomposition mechanism configured to decompose at least one block larger than a pre-determined size to smaller blocks after the time-varying parameter reaches a pre-determined intermediate value.

29. The computer system of claim 28, wherein the time-varying parameter setting mechanism is further configured to increase the time-varying parameter after the time-varying parameter reaches the pre-determined intermediate value, thereby allowing the decomposed blocks to experience additional perturbation.

30. The computer system of claim 22, wherein while receiving the circuit blocks, the receiving mechanism is configured to receive the blocks in a pre-existing two-dimensional (2D) or 3D floorplan.

\* \* \* \* \*